United States Patent [19]
Martin

[11] Patent Number: 5,803,652
[45] Date of Patent: Sep. 8, 1998

[54] SYSTEM FOR ALIGNING CANTILEVERED SHAFTS

[75] Inventor: Andre Robert Martin, Chalon-sur-Saone Cedax, France

[73] Assignee: Eastman Kodak Company, Rochester, N.Y.

[21] Appl. No.: 668,110

[22] Filed: Jun. 21, 1996

[30] Foreign Application Priority Data

Jul. 13, 1995 [FR] France ................................. 95 08769

[51] Int. Cl.⁶ .................................................. B25G 3/16
[52] U.S. Cl. ...................... 403/348; 242/533.7; 403/350
[58] Field of Search ................. 242/533.7, 559, 242/560.2; 403/13, 14, 348, 350

[56] References Cited

U.S. PATENT DOCUMENTS

| | | | |
|---|---|---|---|
| 2,317,729 | 4/1943 | Bruno | 403/348 X |
| 2,969,250 | 1/1961 | Kull | 403/350 |
| 3,042,335 | 7/1962 | Ensign et al. | 242/533.7 X |
| 3,434,369 | 3/1969 | Runkle | 403/350 X |
| 4,087,155 | 5/1978 | Deacon | 403/13 X |
| 4,106,877 | 8/1978 | Ferguson | 403/14 |

FOREIGN PATENT DOCUMENTS

| | | | |
|---|---|---|---|
| 85512 | 5/1958 | Denmark | 403/13 |
| 2459901 | 2/1981 | France . | |
| 3427244 | 1/1986 | Germany | 403/14 |
| 489768 | 3/1992 | Japan | 242/559 |
| 4213568 | 8/1992 | Japan | 242/559 |

*Primary Examiner*—Daniel P. Stodola
*Assistant Examiner*—Gregory J. Strimbu
*Attorney, Agent, or Firm*—Clyde E. Bailey, Sr.

[57] ABSTRACT

A system for precisely aligning two cantilever shafts has a regular polygonal recess having N substantially flat faces on a free end of a first shaft cooperating with N free-rotatable rollers regularly angularly spaced and supported on the free end of the other shaft. The diameter of the circle circumscribed about the rollers is equal to the diameter of the circle inscribed by the N faces of the regular polygonal recess in order to allow introduction of the rollers into the recess when the rollers are aligned with the vertices of the polygonal recess and respective angular rotation of 180/N° between the two cantilever shafts provides precise alignment of the two cantilevered shafts.

4 Claims, 3 Drawing Sheets

SYSTEM FOR ALIGNING CANTILEVERED SHAFTS

FIELD OF THE INVENTION

The invention concerns the positioning and alignment of two elements and applies in particular to the alignment of two cantilevered shafts for the purpose of the transfer of rolls of a web product from the first shaft to the second. This application is given only by way of indication and is not, under any circumstances, of a limitative character.

BACKGROUND OF THE INVENTION

In the field of the photographic industry notably, films are cut to size (35 mm, 16 mm) from a wide sheet (typically 1.30 m wide) which is cut along the length so as to form a plurality of strips of relatively low width. The strips thus formed are wound onto spindles disposed on a motorized winding cantilevered shaft. When a sufficient length of film has been wound onto the spindles, the rolls are unloaded from the winding shaft for a new winding cycle. Generally, this operation is carried out in hidden time, using two winding shafts, one of the shafts being unloaded while the strips are being wound onto the other, thereby limiting as much as possible the stoppage time for the film cutting machine.

In general terms, the rolls are transferred from the winding shaft to an unloading shaft, from which the rolls are unloaded onto cradles provided for this purpose. Typically, transfer from one shaft to the other is carried out by means of a pushing device which surrounds the winding shaft and which is controlled so as to move in translation along the shaft, driving the rolls towards the free end of the shaft.

One of the main problems associated with this roll unloading operation relates to the alignment of the winding shaft and unloading shaft, which is a vital condition for the transfer of rolls by means of pushing. This is because, when it is loaded, the end of the winding shaft flexes under the weight of the rolls, so that it is situated at a height substantially lower than the free end of the unloading shaft designed to receive the rolls (typically, this difference in height can be as much as 1 cm). Such a difference is quite enough to prevent the unloading of the rolls by pushing.

Conventionally, such shafts were aligned by disposing a cone forming a projection on the section of the free end of one of the shafts, a conical recess being formed on the end section of the other shaft so as to receive the said cone. Thus, during the positioning of the unloading shaft with respect to the winding shaft, the cone is engaged in the conical recess, thus compensating for the differences in height between the two shafts. The major drawback with this approach relates to the fact that, when there is a large difference in alignment, the conicity required is large, leading to significant friction, necessitating a substantial amount of energy to bring the two shafts into alignment. This high level of friction also leads to a rapid wearing of the surfaces of the cone and/or of the recess, which inevitably leads to a reduction in the precision of positioning. Furthermore, the cone is in abutment against the walls of the conical recess, thus limiting the depth of engagement between the two shafts. Thus, during the transfer of the rolls from one shaft to the other, the cone can be disengaged from the recess; the winding shaft is then no longer aligned with the unloading shaft, which leads to an interruption in the unloading process.

The problem of the alignment of one component with respect to another also presents itself for applications other than the one referred to previously. By way of example, the handling of objects by robots might be cited, one difficulty with which relates to the fact that the robot must pick up components whose position is known only approximately and which must be transported to a precise location. Typically, this problem is resolved either by improving the precision of the positioning of the component to be gripped, or by equipping the robot with an electronic vision and image analysis system. This approach is costly and increases the cycle time of the robot, owing principally to the time required for the image analysis.

SUMMARY OF THE INVENTION

Thus one of the objects of the present invention is to provide a method for aligning one component with respect to another, free of the drawbacks mentioned with reference to the techniques discussed above. Another object of the present invention is to produce a system for unloading rolls of a product in strip form from a winding shaft onto an unloading shaft, using the alignment method according to the invention.

A further object of the present invention is to provide a device for gripping a component and moving it to a predetermined position, the device using the alignment method according to the invention.

Other objects will appear in detail in the description that follows.

These objects, and others still, are achieved by means of a method for aligning and positioning a first portion of a first element with respect to a corresponding portion of a second element, comprising the following steps:

a) providing the first portion with a regular polygonal recess having N faces, a first circle with a given diameter being inscribed in said polygonal recess;

b) disposing on the corresponding portion of the second element N freely rotating cylindrical rollers, said rollers being positioned in such a way as to be inscribed in a second circle whose diameter is substantially equal to the diameter of the first circle;

c) moving one of the elements with respect to the other in such a way as to introduce the N cylindrical rollers into the said polygonal recess, each of the rollers substantially facing a corresponding vertex of the polygonal recess; and d) turning one of said portions with respect to the other through an angle substantially equal to 180/N°.

Advantageously, the recess is substantially triangular in shape, the angle of rotation of one of the portions with respect to the other being approximately 60°.

According to the present invention, a system for unloading rolls of web product wound on a spindle is also produced, comprising: a first cylindrical cantilevered shaft on which are disposed a plurality of rolls of said web product; a second cylindrical cantilevered shaft disposed so as to receive the rolls from the first shaft; means for aligning said first and second shafts; and means for transferring said rolls from the first shaft to the second;

said system being characterized in that the free end section of one of said shafts is provided with a regular polygonal recess having N faces, a first circle with a given diameter being inscribed in said polygonal recess; and in that it also comprises:

i) N cylindrical rollers mounted so as to rotate on the end section of said shaft, said rollers being positioned in such a way as to be inscribed in a second circle whose diameter is substantially equal to the diameter of the first circle;

ii) means for moving one of the shafts with respect to the other so as to introduce the N cylindrical rollers into said polygonal recess, each of the rollers substantially facing a corresponding vertex of the polygonal recess; and iii) means for turning one of said shafts with respect to the other through an angle substantially equal to $180/N°$.

According to another aspect of the present invention, a device is produced for gripping and moving a component placed on a support, comprising: gripping means borne by an arm, for gripping the component so as to be able to lift it from the support and move it, said gripping means being connected to the arm via an intermediate member, said intermediate member being, during the gripping of the component, free to move in translation in the plane of the support with respect to the arm; means for controlling the movement of the arm; and means for actuating the gripping means;

said device being characterized in that: the intermediate member has a regular polygonal recess having N faces, a first circle with a given diameter being inscribed in said polygonal recess; and in that it also comprises:

i) N cylindrical rollers mounted so as to rotate on the arm, said rollers being mounted in such a way as to be inscribed in a second circle whose diameter is substantially equal to the diameter of the first circle;

ii) means for moving the arm with respect to the intermediate member so as to introduce the N cylindrical rollers into the said polygonal recess, each of the rollers substantially facing a corresponding vertex of the polygonal recess; and iii) means for turning the shaft arms with respect to the intermediate member through an angle substantially equal to $180/N°$ so as to immobilize the intermediate member with respect to the arm in a given position.

BRIEF DESCRIPTION OF THE DRAWINGS

In the description that follows, reference will be made to the drawing in which.

DETAILED DESCRIPTION OF THE DRAWINGS

Figure 1:
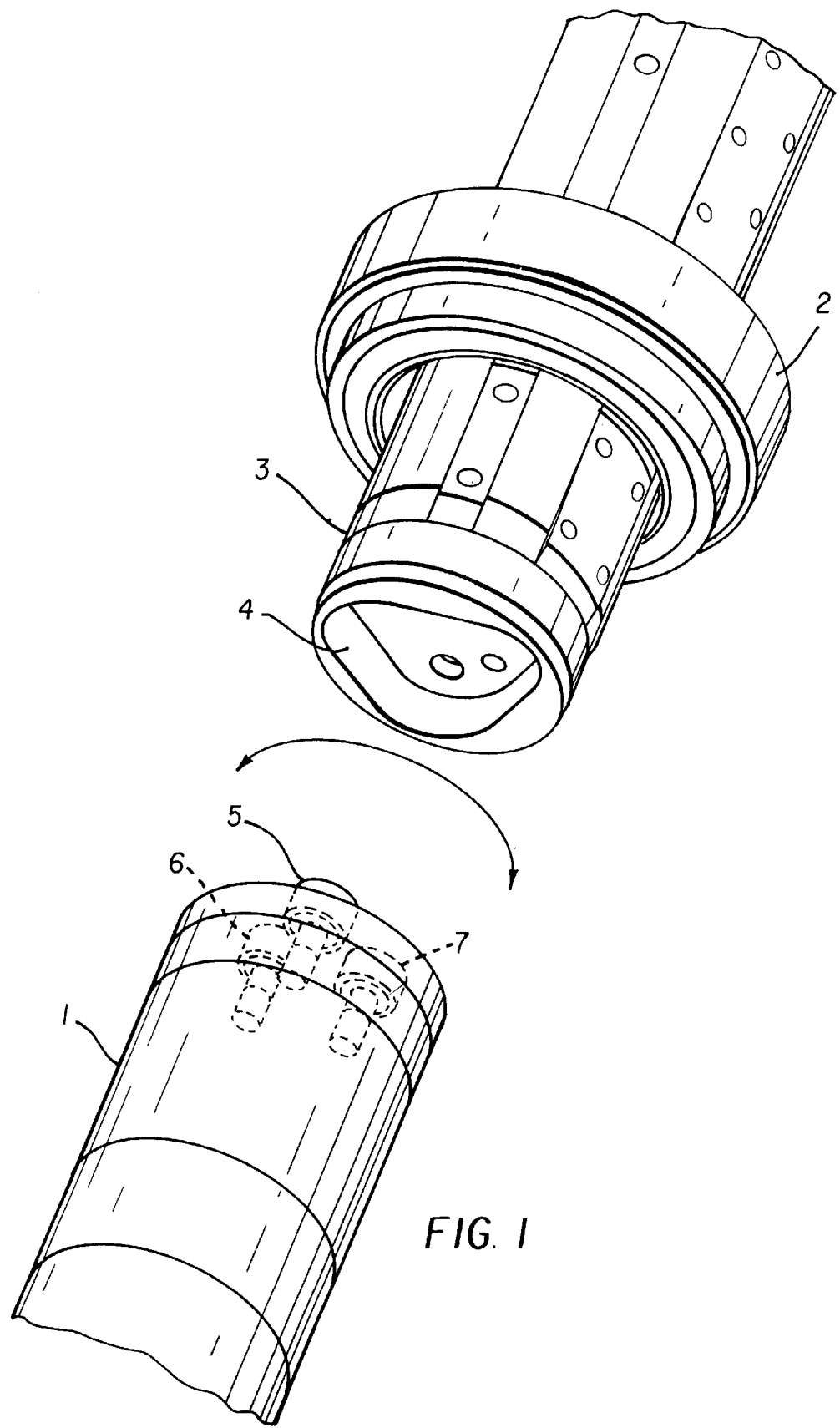
FIG. 1 depicts a part of a system for unloading rolls, using the alignment system according to the invention.

FIG. 1, to which reference is now made, shows on the one hand the free end of the winding shaft 1 on which the strips produced by the cutting device (not depicted) are wound on spindles and, on the other hand, the free end of an unloading shaft 3 designed to receive the rolls 2 transferred from the shaft 1. The means which according to the invention enable the two shafts 1 and 3 to be aligned comprise principally a recess 4 with N sides, in a substantially regular polygonal shape produced in the end section of the unloading shaft 3. The circle (9, FIG. 2A) inscribed in the regular polygon has a given diameter. According to the example depicted, the recess forms substantially an equilateral triangle whose angles are rounded so as to assist the alignment of the two shafts. Typically, the depth of the recess is around 15 mm (in reality, this depth depends on the load to be transferred). It is evident that other shapes can be envisaged, such as, for example, a square, hexagonal or octagonal shape.

The winding shaft 1 has on its end section N rollers 5, 6, 7 disposed in such a way as to be "inscribed" in a circle (10, FIG. 2A) whose diameter is substantially equal to the diameter of the circle 9 inscribed in the recess 4. To be exact, when rollers are being described, the term "inscribed" refers to the fact that they are situated inside the circle 10, and tangent to the said circle, the tangent points being situated at the vertices of a polygon 15, preferably regular, inscribed in the circle 10. According to the example depicted, three rollers 5, 6, 7 are mounted on the end of the shaft 1. By way of example, ball bearings are used. Other similar arrangements can, however, be used.

In reality, it is difficult to have a circle whose diameter is exactly identical to the diameter of the circle inscribed in the recess. According to one embodiment, the diameter of the circle in which the rollers are inscribed is slightly greater (from a few $\mu$m to a few hundredths) than the diameter of the circle inscribed in the recess, so as to stress the two shafts.

Figure 2A:
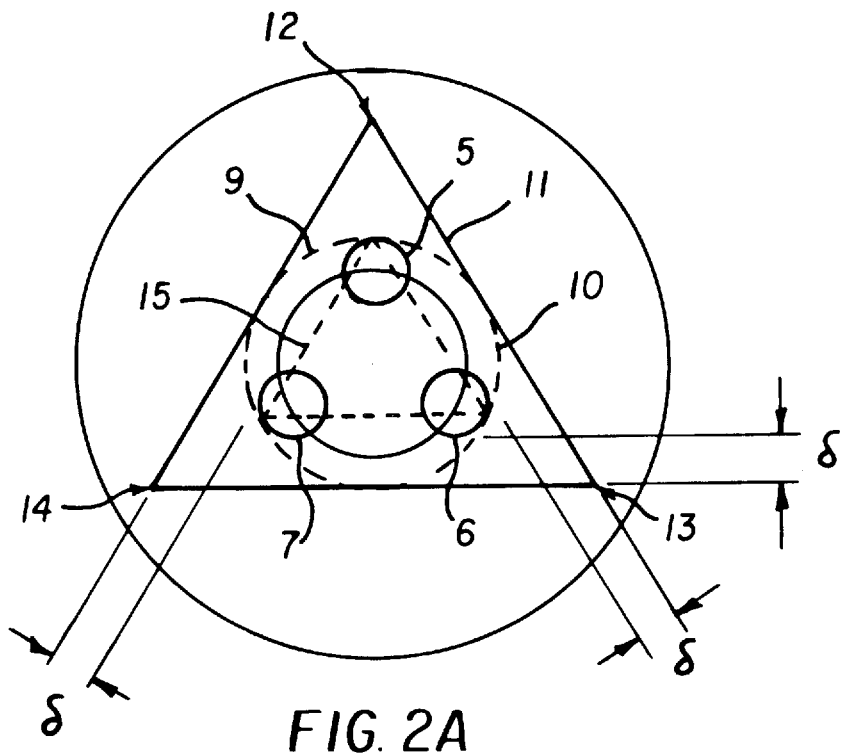
FIGS. 2A–2B illustrate diagrammatically the principle of the operation of the alignment system according to the invention.
Figure 2B:
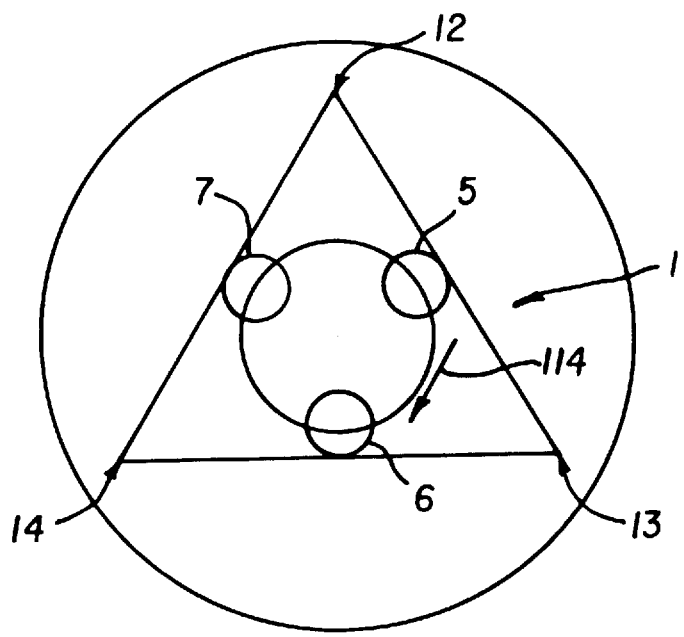

FIGS. 2A and 2B illustrate the geometry and operation of the system according to the invention. When the rolls are to be transferred from the winding shaft 1 to the unloading shaft, the latter is moved in such a way that the rolls 5, 6, 7 engage in the recess in the shaft 1. By way of example, the unloading shaft is mounted so as to pivot (about a vertical axis) on a turret, which is disposed on a motorized carriage so as to be able to move in translation. As can be seen in FIG. 2A, each of the rollers 5, 6, 7 is substantially facing a corresponding vertex 12, 13, 14 of the triangle 11. The alignment gap permitted by the system is marked δ. After the rollers have been introduced into the recess, one of the shafts is rotated with respect to the other by an angle approximately equal to $180/N°$ (a movement depicted by the arrow 174) so as to center the rollers approximately on the respective faces of the recess 4, thereby aligning the two shafts. In the example illustrated, the angle of rotation is around 60°.

Advantageously, and in so far as the winding shaft is motorized in rotation for winding the strips onto the spindles, locking is effected by rotating the winding shaft, for example using a stepping motor. Alternatively, it is the unloading shaft which is rotated in order to align the two shafts.

According to a preferred embodiment, the rollers and the recess are disposed so that, in the locked position, the top generatrices of the cylindrical arbors 1 and 3 are aligned, thus assisting the passage of the rolls from one arbor to the other when the diameter of the unloading arbor 3 is less than the diameter of the winding arbor 1. Alternatively, the recess and the rollers are disposed in such a way that the axes of the arbors are aligned.

According to an alternative, the recess is produced on the winding shaft and the centering rollers are disposed on the unloading arbor. The solution previously described is, however, preferred since the alignment gap is vertical and the forces generated in order to align the winding shaft with respect to the unloading shaft are in the direction of the deformation, thereby facilitating positioning.

The advantage of the approach that has just been described relates to the fact that the introduction of the rollers into the recess requires no effort, the alignment/locking entailing only a rotation movement against a freely rotating roller.

Figure 3:
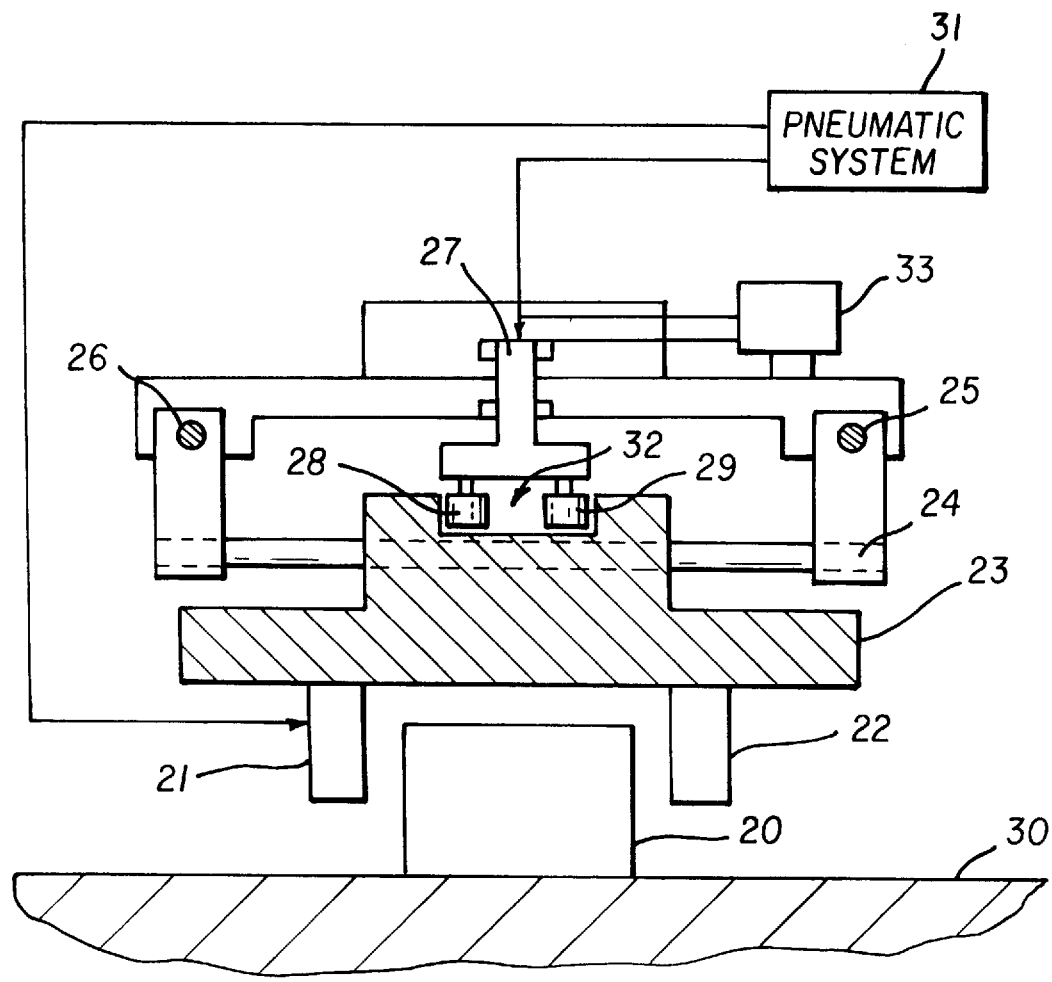
FIG. 3 depicts diagrammatically a robotic arm using the positioning system according to the invention.

FIG. 3, to which reference is now made, illustrates another possible application of the alignment system according to the invention. The latter application concerns the field of the handling of objects by means of a robot, whose difficulty lies in the approximate positioning of the component to be gripped 20. According to the present invention, this problem is resolved by equipping the robot with a positioning device of the type described for the alignment of the arbors. As depicted, the robot comprises a system of grippers 21, 22 designed to grip the component 20 and controlled, for example, by means of a pneumatic system 31 controlled by a programmable automatic controller (not depicted). The grippers 21, 22 are mounted on a gripper support (intermediate member 23). The support 23 is slidably mounted on a set of columns 24, 25, 26 disposed perpendicular to each other and allowing full translational movement in the plane of the support 30 on which the component 20 is positioned. The arm 27 of the robot bears at its end a plurality of positioning rollers 28, 29 of the type described previously and designed to be engaged in a regular polygonal recess 32 provided on a component fixed to the gripper support 23 and disposed opposite the end of the arm 27, means 33 (of the stepping motor type for example) being provided so as to confer on the robot arm 27 a rotation movement through an angle of 180/N° (N being the number of faces of the polygon defined by the recess 32) enabling the gripper support 23 to be immobilized with respect to the robot arm 27, and thereby to confer on the component a precise position of reference with respect to the robot arm. The robot can then move the component 20 to an exact position. In the same way as for the application to the winding/unloading arbors, the rollers 28, 29 can be disposed on the gripper support 23 rather than being on the robot arm 27, the robot arm then bearing the polygonal recess. Also alternatively, the relative rotational movement is produced by pivoting the gripper support in an appropriate manner.

In operation, the robot arm is moved to a precise location situated above the area in which the component to be gripped is approximately positioned; the grippers 21, 22 grip the component 20, which has the effect of slightly moving the position of the gripper support 23 with respect to the robot arm, the extent of the movement depending on the imprecision of the positioning of the component 20 with respect to the arm 27; the robot arm is, preferably, actuated so as to raise the component 20 of the support 30 slightly; the rollers 28, 29 are then introduced into the recess; the robot arm 27 is rotated through an angle of 180/N° (N being the number of faces on the polygon) so as to align the gripper support 23 with the arm of the pivot and immobilize it as a reference with respect to the arm in a predetermined position. Advantageously, the recess (32) is substantially triangular in shape, the arm 27 being immobilized with respect to the gripper support 23 through a rotation of the arm 27 by approximately 60°. The robot arm can then be actuated again in order to move the component 20 and position it in a precise location.

The invention has just been described with reference to preferred embodiments of the invention. It is evident that variants can be made thereto without departing from the spirit of the invention as claimed hereinafter.

I claim:

1. A system for precisely aligning a first cylindrical cantilevered shaft with respect to a second cylindrical cantilevered shaft, said first cylindrical cantilevered shaft has an axis and comprises a free end, said second cylindrical cantilevered shaft has an axis substantially aligned with the axis of said first cylindrical cantilevered shaft and comprises a free end; the system comprising:

a) a regular polygonal recess having N faces adapted to be disposed within the free end of one of said shafts, a first circle with a given diameter being inscribed by said N faces of said polygonal recess;

b) N cylindrical rollers adapted to be rotatably mounted on the free end of the other one of said shafts, said rollers being positioned in such a way as to be equally angularly spaced and inscribed in a second circle whose diameter is substantially equal to the diameter of the first circle;

c) the N cylindrical rollers being received into said polygonal recess, wherein each of the rollers substantially faces a corresponding vertex of the polygonal recess;

d) whereby one of said shafts is rotated with respect to the other one of said shafts through an angle substantially equal to 180/N° once when the N cylindrical rollers are in the polygonal recess in order to precisely align the two cantilevered shafts with respect to each other.

2. A system according to claim 1, wherein said recess is substantially triangular in shape, and the angle being substantially equal to 60°.

3. A system according to claim 1, wherein the diameter of the second circle is slightly greater than the diameter of the first circle.

4. A system according to claim 1, wherein said polygonal recess and said rollers are disposed in such a way that, when precise alignment is obtained, respective top generatrices of the shafts are substantially collinear.

* * * * *

UNITED STATES PATENT AND TRADEMARK OFFICE
CERTIFICATE OF CORRECTION

PATENT NO.  : 5,803,652
DATED       : September 08, 1998
INVENTOR(S) : Andre R. Martin It is certified that error appears in the above-identified patent and that said Letters Patent is hereby corrected as shown below:

Column 4, Line 32:
    delete "arrow 174" and replace with --arrow 114--.

Signed and Sealed this

Fifth Day of January, 1999

Attest:

Attesting Officer

*Acting Commissioner of Patents and Trademarks*